United States Patent [19]
Rowlands

[11] 3,808,529
[45] Apr. 30, 1974

[54] METHOD AND APPARATUS FOR ANALYZING RANDOM SIGNALS

[75] Inventor: Richard O. Rowlands, State College, Pa.

[73] Assignee: The United States of America as represented by the Secretary of the Navy, Washington, D.C.

[22] Filed: June 22, 1973

[21] Appl. No.: 372,893

[52] U.S. Cl. .............................. 324/77 R, 328/139
[51] Int. Cl. ............................................. G01r 23/16
[58] Field of Search......... 324/77 R, 77 D; 328/165, 328/139

[56] References Cited
UNITED STATES PATENTS

| | | | |
|---|---|---|---|
| 3,526,842 | 9/1970 | Andrew | 324/77 R |
| 3,681,780 | 8/1972 | Ross | 328/165 |
| 3,761,809 | 9/1973 | Lockitt et al. | 324/77 R |

Primary Examiner—Alfred E. Smith
Attorney, Agent, or Firm—R. S. Sciascia; L. I. Shrago

[57] ABSTRACT

Apparatus for analyzing random signals so as to determine whether a signal less random than white noise is present. Signals within a desired frequency band are modulated with a pair of quadraturely-phased reference signals which have a frequency preferably equal to the lower frequency of this band. The lower side bands produced when a periodic signal $z(t)$ of constant angular velocity $\omega$ is present are Hilbert transforms of each other. These signals, $\hat{x}(t)$ and $jx(t)$ which equal cosine $\omega(t)$ and sine $\omega(t)$, are examined so as to determine, for example, the number of times per second that $x(t)$ changes from a positive to a negative condition while $\hat{x}(t)$ is positive. This number of wrong way zero axis crossings provides a general indication of the degree of randomness of the periodic signal. Alternatively, the number of wrong way crossings of $x(t)$ that occur for a calculated number of right way crossings are also counted.

7 Claims, 3 Drawing Figures

METHOD AND APPARATUS FOR ANALYZING RANDOM SIGNALS

The present invention relates generally to apparatus for and methods of analyzing ambient noise so as to determine whether a signal source is present therein and to provide an indication of the degree of randomness of such a signal source as compared to white Gaussian noise.

There are many signal detecting systems where it is important to know whether a signal source may be present somewhere in an ambient noise background. This is the case, for example, in radio astronomy where signals emanating from outer space are being detected and interpreted. Also, certain geophysical catastrophic events such as earthquakes or the collapse of mine roofs are usually preceded by warning sounds, and these sounds, too, must be recognized in similar noise backgrounds. In radio, telegraph or satellite communication systems where a channel is used for communicating in either direction on a sequential basis, the detection of the end of a message and the switching of the direction of transmission also requires a similar determination to be made in the same type of signal environment.

The presence of signal sources less random than ambient noise may be detected by analyzing the statistics of the resultant noise background. Instruments for accomplishing this, such as correlators and spectrum analyzers, are available. However, these devices are relatively complicated, and the output which they usually provide has to be processed further before the operator can interpret their results.

It is, accordingly, a primary object of the present invention to provide a method of determining the presence in an ambient noise background of a signal which is less random than white noise.

Another object of the present invention is to provide apparatus which provides a direct indication of the degree of randomness of a signal present in an ambient noise background.

Another object of the present invention is to provide a system which utilizes the statistics of random signals to produce an indication of the degree of randomness of a signal occuring within a pre-selected frequency band.

Other objects, advantages and novel features of the invention will become apparent from the following detailed description of the invention when considered in conjunction with the accompanying drawings wherein.

The theoretical basis for the method and apparatus of the present invention is the comprehensive study of noise by S. O. Rice. His published papers include "Mathematical Analysis of Random Noise" which appeared in the Bell System Technical Journal, Volume 23, July 1944 and other works in Volume 24, January 1945.

The probability that a zero crossing will occur in an interval $t_1$ to $t_1 + dt$ is given in his equation (3.3 – 10) which is $$p \cdot dt = \frac{dt}{\pi} \cdot \left[ \frac{\psi''(o)}{\psi(o)} \right]^{1/2} \quad (1)$$

where $$\psi(o) = \int_{f_a}^{f_b} W(f) df = W_o (f_b - f_a),$$

and $$\psi''(o) = 4\pi^2 \int_{f_a}^{f_b} f^2 W(f) df = 4\pi^2 W_o (f_b^3 - f_a^3)/3,$$

$W_o$ being the power spectral density of the white noise that is limited to the band $f_a$ to $f_b$.

From these equations, the expected number of zero crossings per second is found to be $$2 \left[ \frac{1}{3} \frac{f_b^3 - f_a^3}{f_b - f_a} \right]^{1/2} \quad (2)$$

The mean frequency of the noise, defined as half the expected number of zero crossings per second, turns out to be slightly higher than the midband frequency $f_c$. We will define the excess frequency of the noise as the amount by which this exceeds $f_c$, and the normalized excess frequency, $y$, as the excess divided by $f_c$, then $$y = \left[ \left( \frac{1}{3} \frac{f_b^3 - f_a^3}{f_b - f_a} \right)^{1/2} - f_c \right] \Big/ f_c$$

If we call half the band-width, $f_w$, then $f_b = f_c + f_w$, and $f_a = f_c - f_w$.

Figure 1:
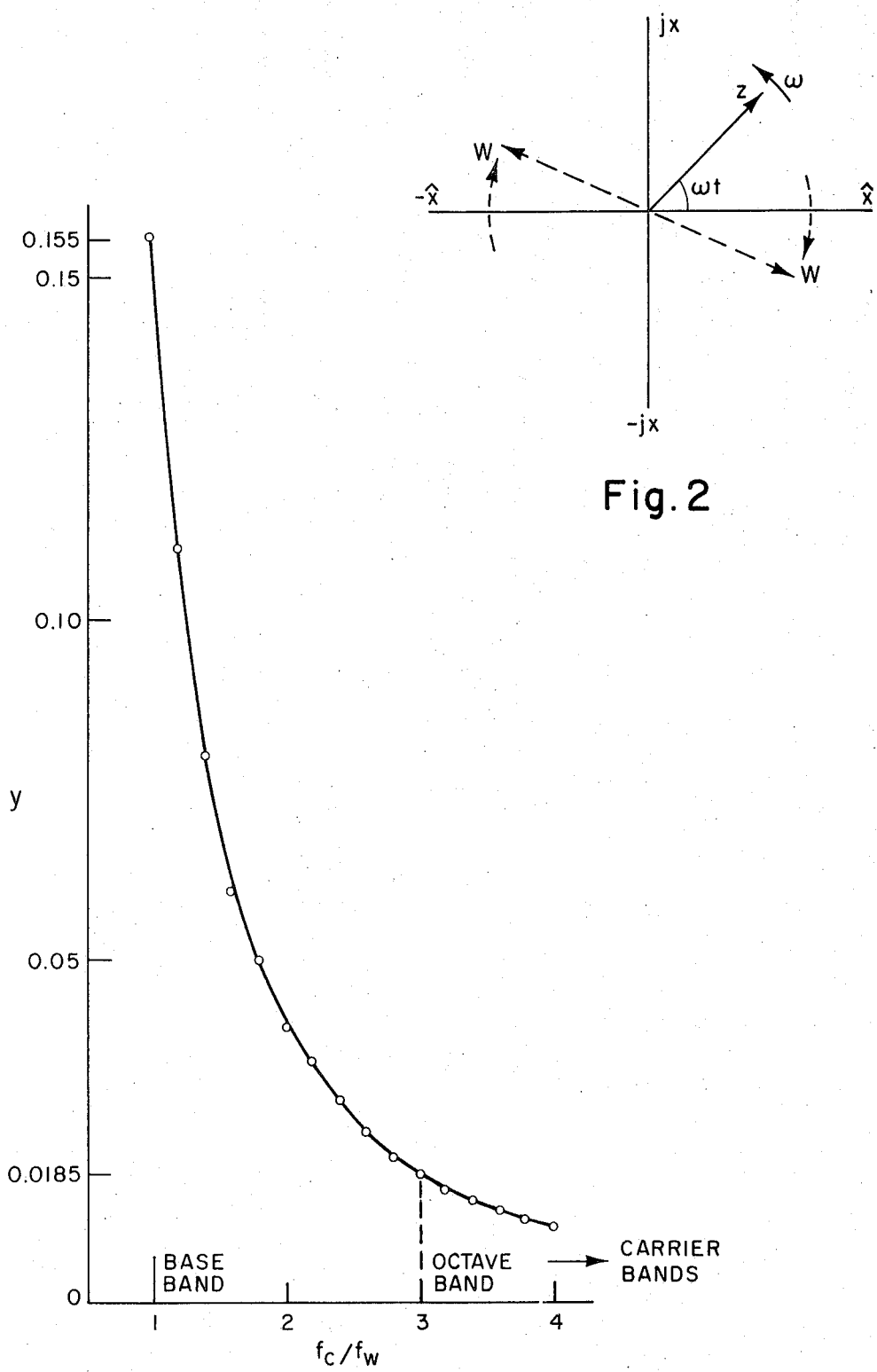
FIG. 1 shows the relationship for white noise between $y$ and $f_c/f_w$ obtained from Rice's formula.

Hence, $$y = \left[ \frac{(f_c + f_w)^2 + (f_c + f_w)(f_c - f_w) + (f_c - f_w)^2}{3 f_c^2} \right]^{1/2} - 1$$

$$= (1 + f_w^2/3f_c^2)^{1/2} - 1 = (1 + 1/3r^2)^{1/2} - 1, \quad (3)$$

where $r = f_c/f_w$. FIG. 1 is a plot showing this relationship. For base-band signals, $f_a = o$, making $f_w = f_c$ and $y = 0.155$. In an octave band, $f_w/f_c = 1/3$ and $y = 0.0185$. For $f_w$ much less than $f_c$, $y \approx 1/6r^2$ and $y \rightarrow o$ as $r \rightarrow \infty$.

In order to understand the physical problem more clearly, let us consider a single frequency signal defined by $x = \sin \omega t$.

Figure 2:
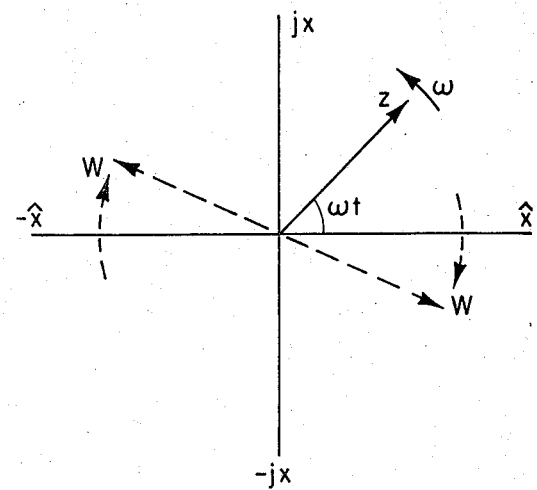
FIG. 2 illustrates the behavior of the complex signal z.

We may regard this as the imaginary part of a complex signal, $z = e^{j\mu t}$, $z$ being a vector of unit amplitude rotating in the complex plane with constant angular velocity, $\omega$. The real part of the complex signal is $\hat{x}$, the Hilbert transform of $x$. Thus, $\hat{x} = \cos \omega t$. If we use the convention shown in FIG. 2 for our components in the z plane, then we have the following fixed relationship between our components.

1. When $\omega t = 2n\pi$, the vector is in the right half-plane and $x$ is changing from negative to positive, corresponding to an upward crossing of the zero axis.
2. When $\omega t = (2n-1)\pi$, the vector is in the left half-plane and we have a downward crossing of the zero axis. Having established these fixed relationships for a sine wave, we now consider the more complicated noise signals.

A white noise $x(t)$, limited to the range $f_c - f_w$ to $f_c + f_w$, may be represented as follows:

$x(t) = a(t) \cos \omega_c t + b(t) \sin \omega_c t$, where $a(t)$ and $b(t)$ are two independent noise signals equal in power to $x(t)$, but whose spectra are limited to the range 0 to $f_w$, and $f_c$ is the midband frequency.

An alternative way of representing $x(t)$ is as follows: $x(t) = \gamma^2(t) = a^2(t) + b^2(t)$ and $\phi(t) = \arctan[a(t)/b(t)]$. Following the same procedure as was used with the sine wave, we may regard this as the imaginary component of the vector $z(t) = \gamma(t) \exp j[\omega_c t + \phi(t)]$. The angular velocity of this vector, however, is not constant, being given by $$\omega = \omega_c + \phi^1(t), \quad (4)$$

where $$\phi^1(t) = a^1 b - a b^1 / a^2 + b^2 \quad (5)$$

Since $\phi^1(t)$ is a function of the zero mean Gaussian random variables $a(t)$ and $b(t)$, it must also be a random variable with a mean of zero. We may therefore regard $z$ as a vector rotating with a mean angular velocity $\omega_c$ but with a jitter $\phi^1(t)$ superimposed upon it. There will be times when $\phi^1(t)$ exceeds $\omega_c$ causing the vector to reverse its direction of rotation for these periods, which will in general be brief. They will occur with equal probability at all phase angles including $$\omega_c t + \phi(t) = n\pi.$$

We therefore find, that for noise, some upward crossings can occur when the complex vector is in the left half-plane and some downward crossings when it is in the right half-plane. The frequency of a sine wave may be defined as the rate of change of phase divided by $2\pi$, and this is identically equal to the number of upward, or downward, crossings per second. For noise, however, the two definitions are not synonymous. The average rate of change of phase is still $\omega_c$, but the fact that the vector can reverse its direction of rotation will cause extra zero crossings to occur. A relationship between mean rate of change of phase and the mean number of zero crossings still exists, but it is now:

$$\omega_c/2\pi = M_{ur} - M_{dr} = M_{dl} - M_{ul},$$

where $M_{ur}$ = mean number of upward crossings in the right half-plane and a comparable definition for the others. For convenience, we will call the downward crossings in the right half-plane and the upward crossings in the left half-plane "wrong" crossings, the mean value being $$M_w = M_{dr} + M_{ul}$$

The remainder will be called "right" crossings with a mean value of $$M_r = M_{ur} + M_{dl}$$

Hence, $2f_c = M_r - M_w$. If we normalize the total number of crossings by dividing by $2f_c$, and subtract 1 from the quotient, the result should be equal to $y$, as defined in equation (3). This makes $$y = M_r + M_w/M_r - M_w - 1 = 2M_w/M_r - M_w \quad (6)$$

From the mathematical analysis and discussion presented hereinabove, it may be concluded that if a single $x(t)$ is combined with its Hilbert transform $\hat{x}(t)$ to produce a complex signal $$z(t) = \hat{x}(t) + jx(t) = \gamma(t) e^{i\theta(t)}$$

the radian frequency $\dot\theta(t)$ is always positive when $x(t)$ is a "regular" signal, such as a single frequency, but that $\dot\theta(t)$ can, on occasion, be negative when $x(t)$ is a random signal, such as white noise. Thus, the proportion of time that $\dot\theta(t)$ is negative may be used to measure the degree of randomness of a signal. The most convenient time to measure this is when $x(t)$ passes through zero since one can then easily distinguish between an upward and a downward crossing.

All of the possible combinations of events involving $\dot\theta(t)$ are summarized in the following table:

TABLE

| $\dot\theta(t)$ | $x(t)$ | $\hat{x}(t)$ |
|---|---|---|
| + | − to + | + |
| + | + to − | − |
| − | + to − | + |
| − | − to + | − |

If $x(t)$ is band-limited, white noise extending down to zero frequency, the number of times per second that $\dot\theta(t)$ is negative during an axis crossing is $0.155 f_c$ where $f_c$ is the center frequency of the band. It will be recalled that in the above mathematical presentation $y = 0.155$ when $f_a = 0$ making $f_w = f_c$.

The above percentage, that is the quantity 0.155, as shown in FIG. 1, decreases as the band is moved up from zero frequency. Thus, a base-band extending down to zero is the most efficient portion of the frequency spectrum for detecting whether a signal is random or not. Any band-limited signal may, of course, be shifted down to the base-band by a process of modulation, and this procedure is utilized in the apparatus of the present invention for measuring the randomness of a signal.

Figure 3:
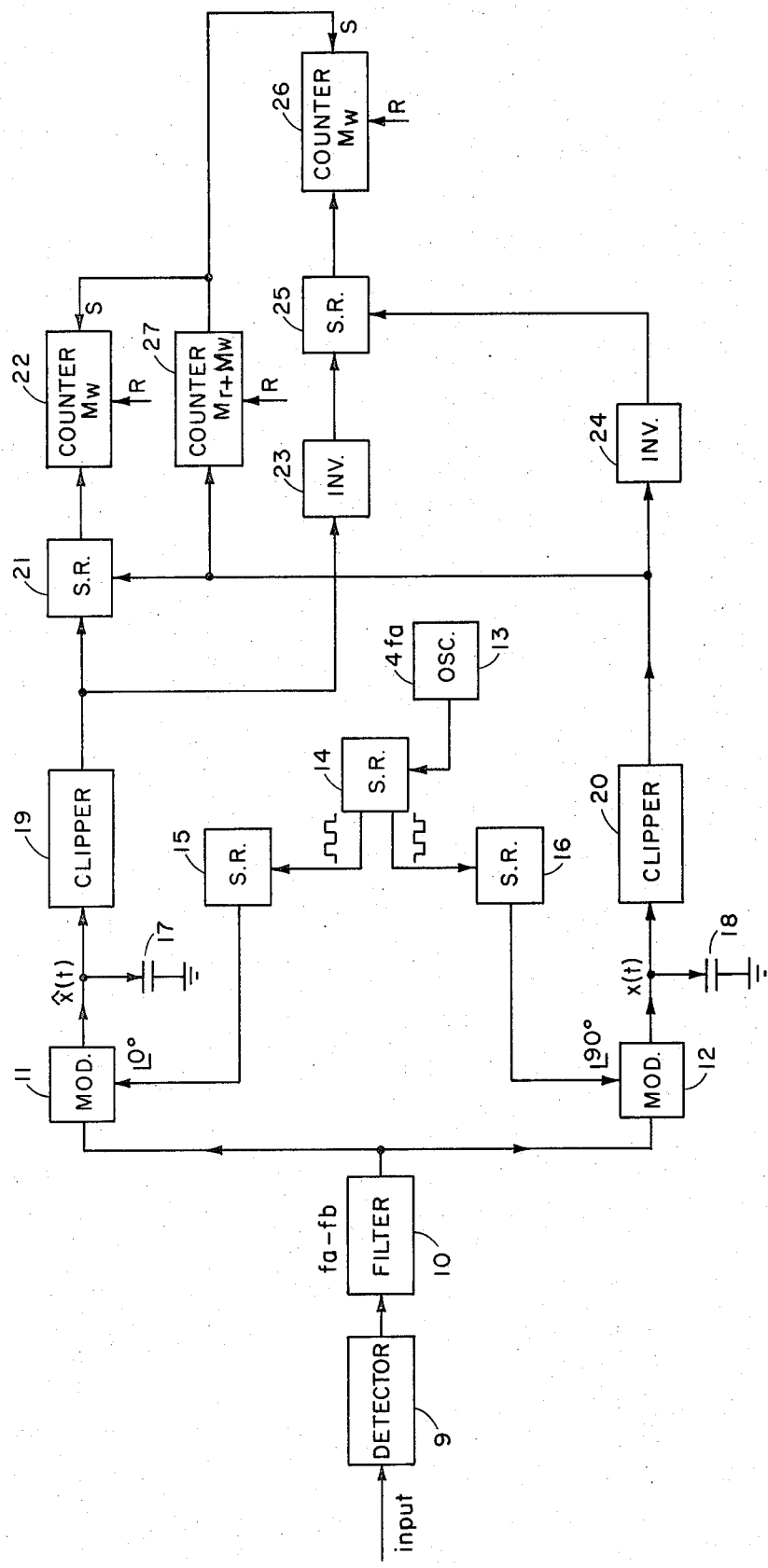
FIG. 3 is a block diagram of one preferred embodiment of the invention.

Referring now to FIG. 3, the input signal that is to be analyzed which is available as a consequence of an appropriate detecting operation, is applied to a filter 10 to remove any components that may be outside the band of interest, here defined by $f_a - f_b$. The filtered signal is then applied to the inputs of a pair of modulators 11 and 12. These modulators are driven with signals derived from oscillator 13 whose frequency is adjusted to be four times that of the lower edge, $f_a$, of the filter pass band. More particularly, the signal from oscillator 13 is fed first to a shift register 14 which divides its frequency by two and provides two square wave output signals of the same frequency but in phase opposition. Each of these signals, $2f_a$, is thereafter subjected to a further frequency division by two in shift registers 15 and 16. The results of this signal processing are two quadrature square waves $f_a$, and these signals are supplied to modulators 11 and 12.

When the filtered input is modulated by these two quadrature signals and the upper side bands removed, the remaining two lower side bands are Hilbert transforms of each other, one corresponding to $x(t)$ and the other $\hat{x}(t)$.

Removal of the upper side bands produced by the modulation process is accomplished by means of shunt capacitors 17 and 18. It will be appreciated that this simple arrangement is satisfactory if the upper side band frequencies are much higher than the lower side band frequencies. Where this is not the case, appropriate filtering may be utilized to accomplish this result.

Since it is only the polarity and direction of change in polarity of $\hat{x}(t)$ and $x(t)$ that are needed to ascertain the polarity of $\dot{\theta}(t)$, the two lower side bands are fed to clippers 19 and 20 which impart uniform amplitudes to these signals and prepare them for further processing by means of binary circuits. The clipped $\hat{x}(t)$ is applied to the commoned inputs of a shift register 21 while the clipped $x(t)$ is applied to the shift input thereof. Shift register 21 is selected such that its output changes state only when the conditions shown in the third row of Table 1 apply. In other words, $\hat{x}(t)$ must be positive and $x(t)$ must be changing from positive to negative for register 21 to respond. When these conditions obtain $\dot{\theta}(t)$ is negative. It would be noted that $\dot{\theta}(t)$ is also negative under opposite conditions, that is, when $\hat{x}(t)$ is negative and $x(t)$ is changing from negative to positive.

The output of shift register 21 is sent to a counter 22 which records the number of times per second that the above change of state or sign occurs. Thus, the count recorded is a measure of the proportion of time that $\dot{\theta}(t)$ is negative and, hence, the degree of randomness of any detected signal.

It should be recognized that the count accumulated in register 22 identifies half the number of times per second that $\dot{\theta}(t)$ is negative. However, this measure should be sufficient on a statistical basis. If a more precise indication is desired then, of course, the system may include a provision for counting the other occasions corresponding to the fourth row of the Table. This can be readily accomplished by inverting $x(t)$ and $\hat{x}(t)$ in circuits 23 and 24 coupled to clippers 19 and 20 and, thereafter, applying these inverted signals to a shift register 25 operating in the same manner as companion shift register 21. When the output of shift register 24 changes sign, this condition is sensed by counter 26 and the count therein appropriately advanced duplicating again the behavior of counter 22.

It would be pointed out that, if desired, the system of FIG. 3 may be appropriately modified so that the number of times that $\dot{\theta}(t)$ is positive during an axis crossing may also be measured by having a shift register respond to the conditions shown in the first and second rows of Table 1. This would provide an indication of the mean number of right crossings, $M_r$. This approach, however, is less accurate since $M_r$ only changes by 15 percent whereas $M_w$ changes by 100 percent as conditions vary from white noise to a regular signal. Using equation (6) and knowing the mean number of wrong crossings, $M_w$, one could solve for $y$. In this connection, for a base-band signal, a reading of 0.155 would indicate a completely random signal while a reading of 0 would indicate a non-random signal. For intermediate values, the higher the value, the more random the signal.

The circuit of FIG. 3, it should be appreciated, provides an indication of the number of wrong crossings, and the operator has to calculate $y$ therefrom. To avoid this and provide a reading which may be directly interpreted, an additional counter 27 may be added to the system so as to count the number of upward crossings of $x(t)$ and stop counters 22 and 26 when the count registered therein reaches a predetermined value. Thus, for example, if 100 wrong crossings designate base-band white noise, then from equation (6) the number of upward crossings for this condition corresponds to 1490. This is derived from $M_r - M_w = 2M_w/Y$ or $M_r + M_w = 2M_w(1 + 1/y)$, with $y = 0.155$ and $M_w = 100$. When counter 27 reaches 1490, counters 22 and 26 are therefore disabled, and the average of the counts registered therein may be compared to 100 to ascertain the randomness of the signal being analyzed.

It would also be noted that most signals that are of practical interest have a band width of only one octave or less or can be split up into a number of such bands. If the signal to be processed in the system of the present invention is already at base-band, an extra modulator should be included at the front end of the system to shift the signal up the frequency signal so that it accompanys a band width of less than an octave. The desirability of operating at or near base-band is that the value of $y$, as shown in FIG. 1, changes from a value of 0.155 for a random signal to 0 for a regular signal rapidly. Thus, sensitivity is quickly lost as one departs from this band.

What is claimed is:

1. Apparatus for analyzing random signals so as to determine whether a signal $z(t)$, which is less random than white noise, is present comprising, means for developing from said random signals a pair of signals $\hat{x}(t)$ and $x(t)$ which are the real and imaginary parts of the complex signal $z(t)$ and correspond to $\cos \omega(t)$ and $\sin \omega(t)$, respectively; and means for indicating the number of times per unit time that one of said pair of signals crosses a zero axis in a wrong direction, said number of times being indicative of the degree of randomness of said periodic signal.

2. In an arrangement as defined in claim 1 wherein said unit time corresponds to the time required for said one signal to cross the same zero axis a calculated number of times in a right direction.

3. In a method for analyzing random signals occuring within a pre-selected frequency band so as to determine whether a signal less random than white noise is present, the steps of modulating said random signals with a pair of quadraturely-phased reference signals having a frequency equal to the lower limit of said band, the lower side bands produced when a periodic signal $z(t)$ of constant angular velocity, $\omega$, is present corresponding to $\hat{x}(t)$ and $jx(t)$ and being equal to $\cos \omega(t)$ and $\sin \omega(t)$, respectively; and counting the number of times per unit time that $x(t)$ crosses the zero axis from a positive to a negative condition while $\hat{x}(t)$ is positive, the count so obtained being indicative of the number of wrong zero axis crossings of the vector $z(t)$ and, consequently, the degree of randomness of said periodic signal.

4. In a method as defined in claim 3
wherein the number of times per unit time that $x(t)$ crosses the zero axis and changes from a negative to a positive condition while $\hat{x}(t)$ is negative is also counted; and
wherein the two counts so obtained are averaged to provide an indication of the randomness of said periodic signal, the degree of randomness being inversely proportional to the magnitude of said average count.

5. Apparatus for analyzing random signals so as to determine whether within a pre-selected frequency band a signal less random than white noise is present comprising,
means for modulating said random signals which are within said pre-selected frequency band with a pair of quadraturely-phased reference signals whose frequency is related to the lower limit of said band;

means for filtering said modulated signals so as to extract the lower side bands which are produced when a periodic signal $z(t)$ of constant angular velocity, $\omega$, is present, said side bands corresponding to $\hat{x}(t)$ and $jx(t)$ and being equal to $\cos \omega(t)$ and $\sin \omega(t)$, respectively; and
means for counting the number of times per unit time that $x(t)$ crosses the zero axis from a positive to a negative condition while $\hat{x}(t)$ is positive,
the count so obtained being inversely proportional to the degree of randomness of said periodic signal.

6. In an arrangement as defined in claim 5
means for counting the number of times per unit time that $x(t)$ crosses the zero axis from a negative to a positive condition while $\hat{x}(t)$ is negative,
the count so obtained also being inversely proportional to the degree of randomness of said periodic signal.

7. In an arrangement as defined in claim 5
means for counting the number of times that $x(t)$ crosses the zero axis and changes from a positive to a negative condition for a predetermined number of times that it crosses the same zero axis from a negative to a positive condition.

* * * * *